United States Patent [19]
Abe et al.

[11] Patent Number: 6,104,460
[45] Date of Patent: Aug. 15, 2000

[54] REFLECTIVE LCD WITH CYLINDRICAL PATTERN FORMED IN REFLECTING ELECTRODE REGION

[75] Inventors: Makoto Abe; Ikuo Hiyama; Makoto Tsumura; Osamu Itoh, all of Hitachi, Japan

[73] Assignee: Hitachi, Ltd., Tokyo, Japan

[21] Appl. No.: 09/179,089

[22] Filed: Oct. 27, 1998

[30] Foreign Application Priority Data

Oct. 27, 1997 [JP] Japan .................................. 9-293977

[51] Int. Cl.[7] .................................................. G02F 1/1335
[52] U.S. Cl. .................................................. 349/113
[58] Field of Search ............................................. 349/113

[56] References Cited

U.S. PATENT DOCUMENTS

| | | | |
|---|---|---|---|
| 4,431,272 | 2/1984 | Yazawa et al. | 350/336 |
| 4,519,678 | 5/1985 | Komatsubara et al. | 350/338 |
| 5,408,345 | 4/1995 | Mitsui et al. | 349/113 |
| 5,418,635 | 5/1995 | Mitsui et al. | 359/70 |
| 5,526,149 | 6/1996 | Kanbe et al. | 349/113 |

*Primary Examiner*—Kenneth Parker
*Assistant Examiner*—Heidi L. Eisenhut
*Attorney, Agent, or Firm*—Antonelli, Terry, Stout & Kraus, LLP

[57] ABSTRACT

A reflective liquid crystal display apparatus realizing a bright image display without using a backlight is provided. In this reflective liquid crystal display apparatus, a reflecting electrode having a scattering property and a directional property is manufactured using a small number of steps. A pattern of unevenness, such as a polygonal pattern, a cylindrical pattern, and the like, is formed on an insulating substrate utilizing a material layer formed for composing switching devices. By causing the unevenness of the pattern to influence the surface contour of the reflecting electrodes, it becomes possible to give both a scattering property and a directional property to the surface of the reflecting electrodes.

13 Claims, 9 Drawing Sheets

REFLECTIVE LCD WITH CYLINDRICAL PATTERN FORMED IN REFLECTING ELECTRODE REGION

BACKGROUND OF THE INVENTION

The present invention relates to a reflective liquid crystal display apparatus, which can realize a bright image display using no back light.

An example of a conventional reflective liquid crystal display apparatus is disclosed in JP-A-8-184846 (1996).

Figure 15:
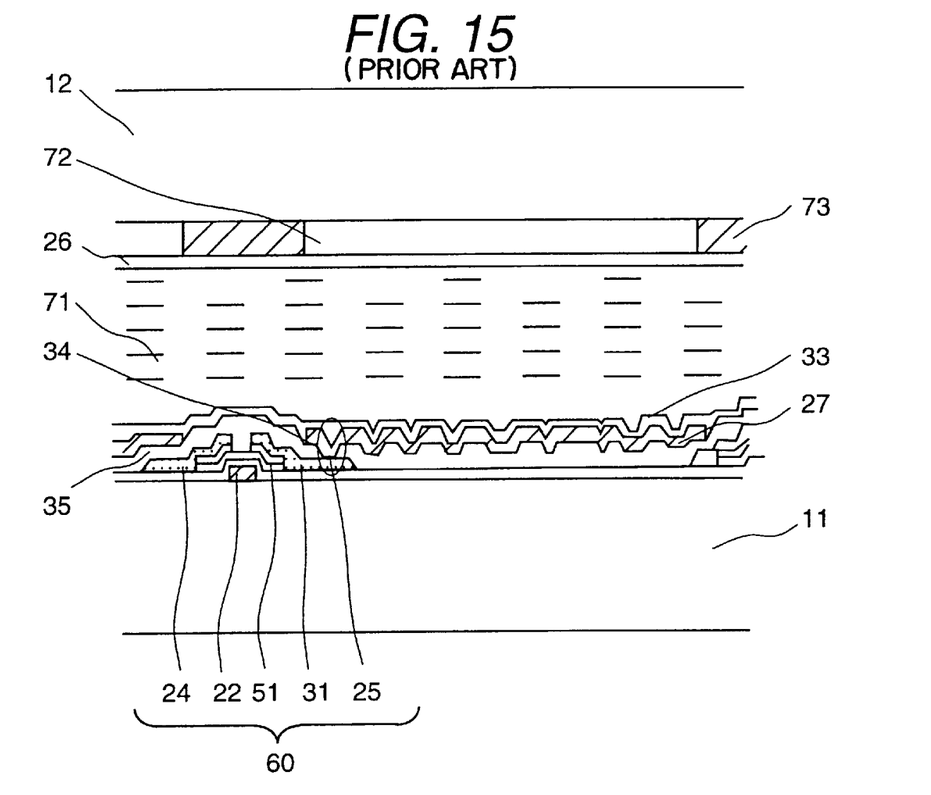
FIG. 15 is a schematic cross sectional view of a first example of a conventional reflective liquid crystal display apparatus.

FIG. 15 is a cross section of the conventional reflective liquid crystal display apparatus, wherein switching devices 60, an insulating layer 35, and a reflecting electrode 27 are formed sequentially on an insulating substrate 11. Color filters 72 and a transparent electrode 26 are formed on another transparent insulating substrate 12. The apparatus is formed so that a liquid crystal material 71 is interposed between the two substrates. Unevenness on the surface of the insulating layer 35 is formed by etching. The etching process here refers to a series of processes comprising the steps of coating with a resist, photolithography, etching, and stripping the resist. Subsequently, contact holes 34 for electrically connecting the reflecting electrode 27 and a source electrode 25 are formed by further etching. As explained above, the shape of the unevenness affects the contour of the surface of the insulating layer 35, thereby producing a corresponding unevenness on the surface of the reflecting electrode 27, which is formed on the surface of the insulating layer 35. The reflecting electrode 27 has a light scattering property based on this unevenness.

In FIG. 15, each switching device includes a gate electrode 22, an insulating layer 31, a semiconductor layer 51, and a drain electrode 24. On the lower substrate 11, there is an insulating layer 33 in contact with the liquid crystal layer 71, and the transparent electrode 26 is provided on the color filter 72. A black matrix 73 is formed on the transparent insulating substrate 12.

Figure 16:
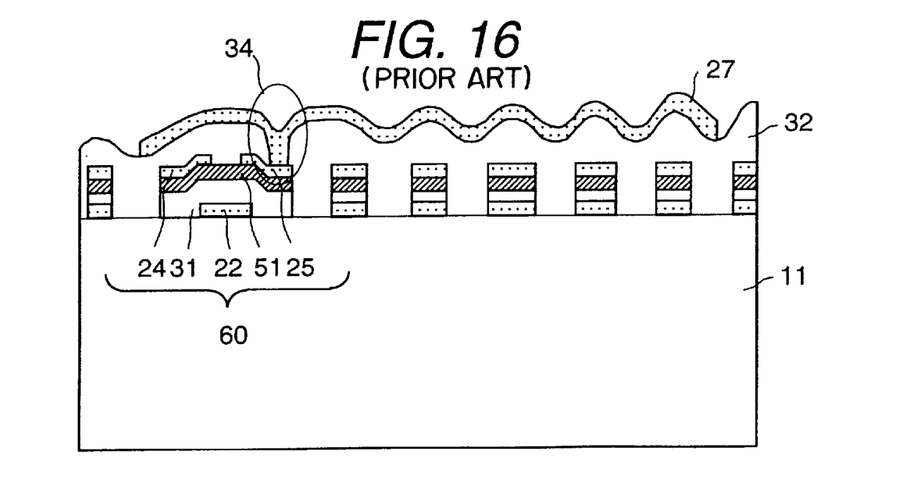
FIG. 16 is a schematic cross sectional view of a second example of a conventional reflective liquid crystal display apparatus.

Another reflective type liquid crystal display apparatus is disclosed in JP-A-9-54318 (1997). A schematic cross section of part of this reflective type liquid crystal display apparatus is shown in FIG. 16. A switching element 60, an insulating layer 32, and a reflecting electrode 27 are formed on an insulating substrate 11, sequentially. In accordance with this structural arrangement, unevenness is formed on the surface of the reflecting electrode 27.

In this regard, a pattern of islands is previously formed with the material forming the switching element 60 in the region wherein the reflecting electrode 27 is arranged.

In this way, an unevenness is formed on the surface of the reflecting electrode 27, eliminating the need to form the unevenness on the surface of the insulating layer 32 by etching.

SUMMARY OF THE INVENTION

The conventional reflective liquid crystal display apparatus referred to above has the following problems.

In accordance with the apparatus disclosed in JP-A-8-184846 (1996), the etching step is required to be performed twice on the surface of the insulating layer 35. One step is for forming the unevenness on its surface, and the other step is for forming the contact holes. Therefore, a resulting decrease in the throughput and an increase in the cost of manufacture become problems.

The etching step for forming the unevenness on the surface of the insulating layer 35 is performed only once. The unevenness is formed in order to give a light scattering property to the reflecting electrode, and not to give a directional property to the reflecting electrode. In order to give both a directional property and a scattering property to the reflecting electrode, it is necessary to etch the surface of the insulating layer 35 twice. However, the problems described above, such as a decrease in the throughput and an increase in the cost of manufacture are a result from increasing the number of etching steps.

One of the objects of the present invention is to improve the throughput and to decrease the cost of manufacture by suppressing an increase in the number of the manufacturing steps for giving a scattering property and/or a directional property to the reflecting electrode.

Another object of the present invention is to provide a reflective liquid crystal display apparatus having a bright image display by increasing the aperture ratio.

The above objects can be achieved in the following way.

That is, the above objects can be achieved by forming polygonal patterns or cylindrical patterns in a region, wherein the reflective electrode is arranged, using a layer used for forming the switching devices. A polygonal pattern has the ability to give a scattering property to the reflecting electrode and a cylindrical pattern has the ability to give a directional property to the reflecting electrode.

Because the material for forming the switching device has at least three layers, the scattering property and the directional property can be achieved concurrently in the reflecting electrode by using each of the above three layers as a layer for forming a polygonal pattern and a layer for forming a cylindrical pattern.

DETAILED DESCRIPTION OF THE PREFERRED EMBODIMENTS

Hereinafter, various embodiments of the present invention will be explained with reference to the drawings.

Embodiment 1

Figure 1:
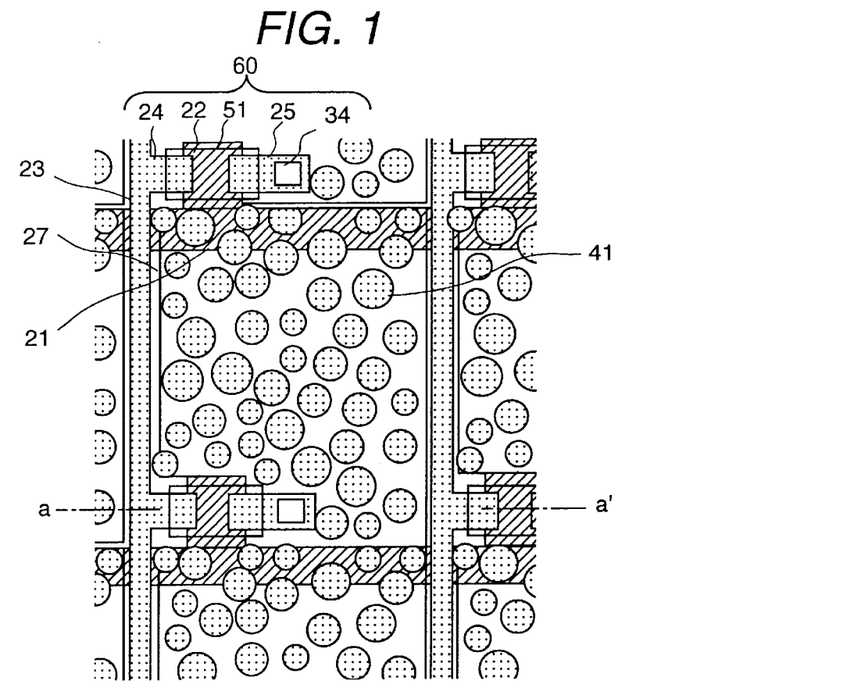
FIG. 1 is a plan view of a substrate at a side having switching devices and reflecting electrodes in a reflective liquid crystal display apparatus representing a first embodiment of the present invention.
Figure 2:
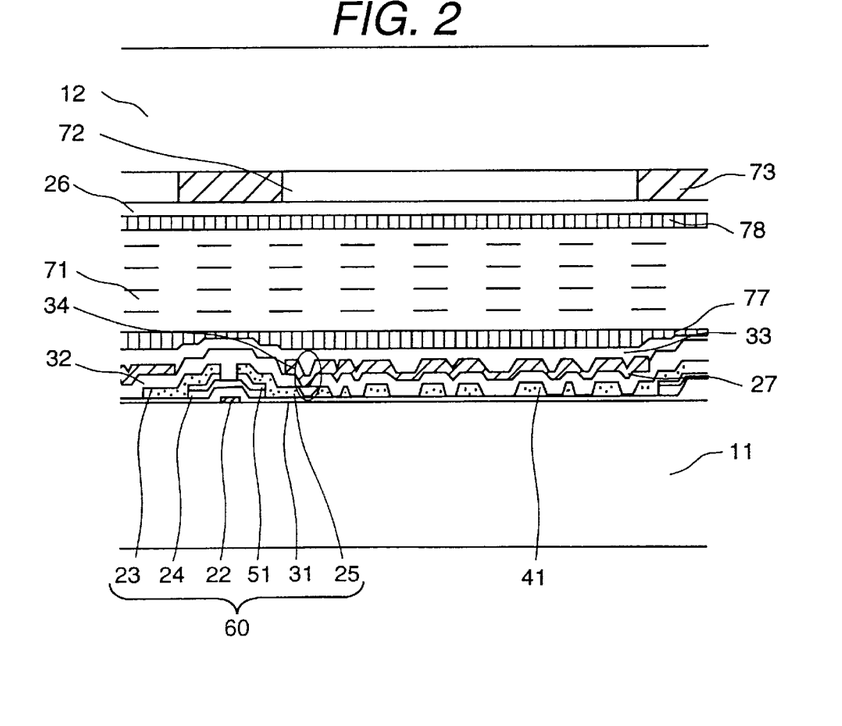
FIG. 2 is a schematic cross sectional view taken along the line a–a' in FIG. 1.
Figure 3:
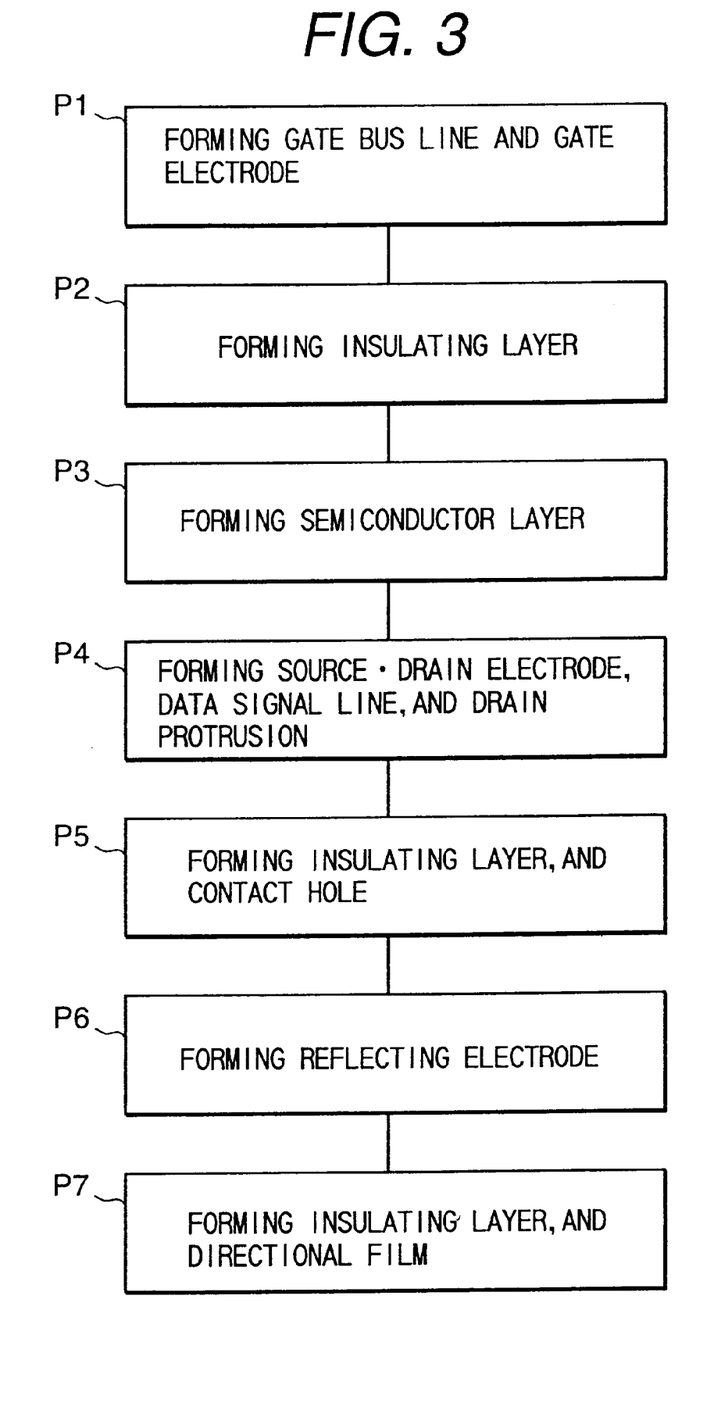
FIG. 3 is a flow chart indicating steps in the manufacture of the substrate at a side having switching devices and reflecting electrodes in a reflective liquid crystal display apparatus according to the first embodiment of the present invention.
Figure 4A:
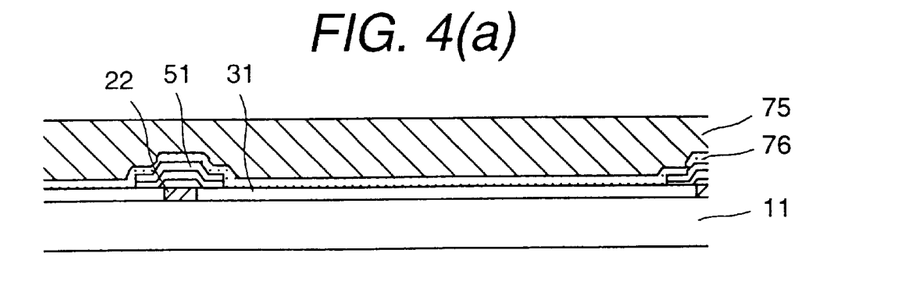
FIGS. 4(a) to 4(d) are a set of schematic cross sections indicating manufacturing steps for forming a circular pattern of a drain in the first embodiment of the present invention.
Figure 4B:
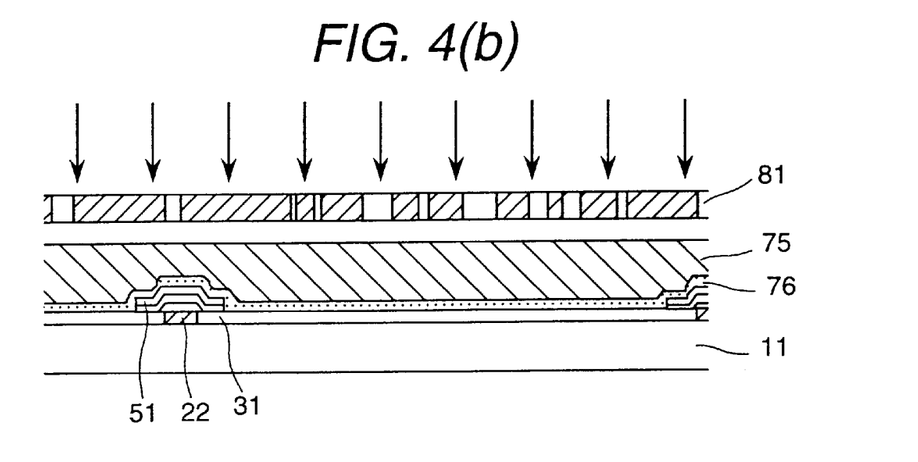
Figure 4C:
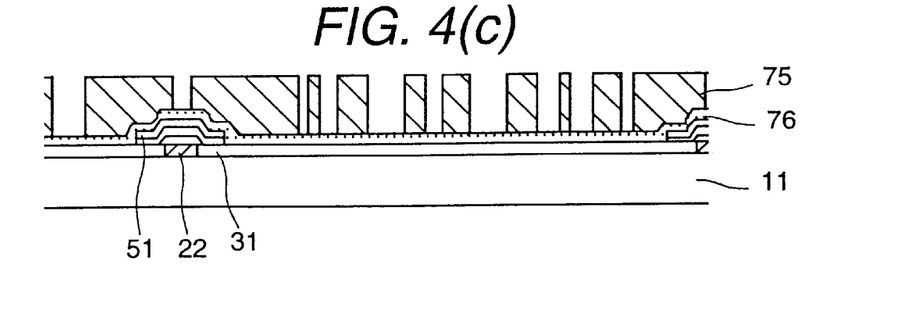
Figure 4D:
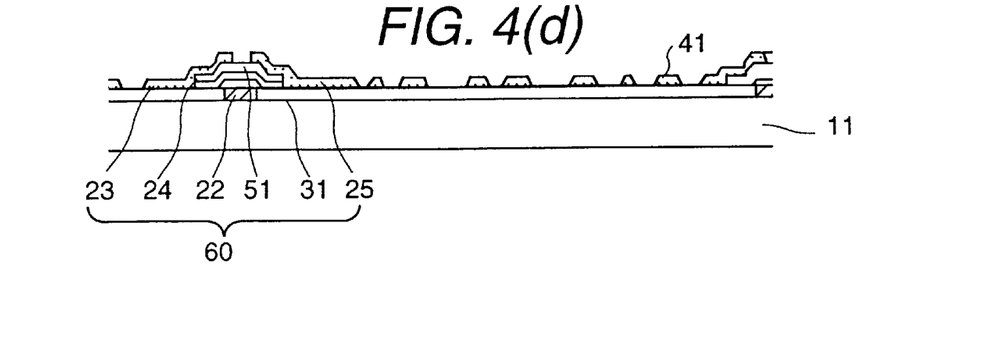

FIG. 1 is a plan view of a substrate at a side having switching devices and reflecting electrodes in a reflective liquid crystal display apparatus representing a first embodiment of the present invention. FIG. 2 is a schematic cross sectional view taken along the line a–a' in FIG. 1. FIG. 3 is a flow chart for explaining the steps for manufacture of the substrate at a side having the switching devices and the reflecting electrodes in the reflective liquid crystal display apparatus of the first embodiment of the present invention. FIGS. 4(a) to 4(d) show a set of schematic cross sections indicating the manufacturing steps for forming a circular drain pattern.

The reflective liquid crystal display apparatus according to the present embodiment comprises an insulating substrate 11, switching devices 60, gate bus lines 21, data signal lines 23, a circular drain pattern 41, an insulating layer 32, contact holes 34, reflecting electrodes 27, an insulating layer 33, an alignment layer 77, a liquid crystal layer 71, an alignment layer 78, transparent electrodes 26, color filters 72, a black matrix 73, and a transparent insulating substrate 12.

The switching devices 60 are composed of a respective layer of gate electrodes 22 formed on the insulating substrate 11, an insulating layer 31, a semiconductor layer 51, drain electrodes 24, and source electrodes 25.

A method of manufacturing the reflective liquid crystal display apparatus of the first embodiment will be explained hereinafter.

The substrate at the side having the switching devices and the reflecting electrodes is manufactured by the steps, as indicated in FIG. 3, of forming the gate electrodes 22 and the gate bus line 21 by the step P1 in order to form the switching devices 60 on the insulating substrate 11, forming the insulating layer 31 by the step P2, and forming the semiconductor layer 51 by the step P3. Subsequently, the circular drain pattern 41 is formed concurrently with the data signal line 23, the drain electrodes 24, and the source electrodes 25 by the step P4. That is, the circular drain pattern 41 is formed using a part of the material layer, which is formed when the switching devices are formed. In accordance with the present embodiment, the circular drain pattern 41 is formed using a part of the material layer provided for forming the data signal line 23, the drain electrodes 24, and the source electrodes 25 of the switching devices 60, and is formed concurrently utilizing the etching step for forming these electrodes.

Figure 11:
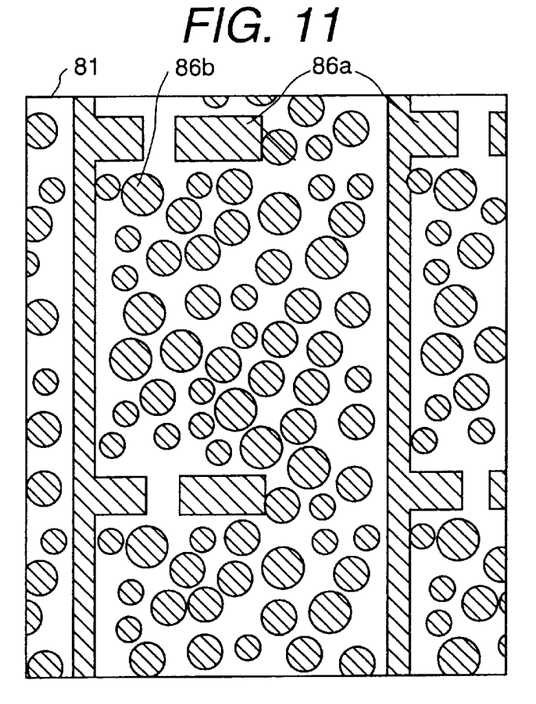
FIG. 11 is a plan view of a drain mask used in forming the circular drain pattern in the first embodiment.

A method of forming the circular drain pattern 41 will be further explained in detail with reference to FIG. 4. A metallic material layer 76 which is 400 nm in thickness is formed by a method, such as spattering and the like, after forming the semiconductor layer 51. A resist layer 75 of 2 μm in thickness is formed by coating the metallic material layer with a resist material (OFPR-800, made by Tokyo Ouka Co.) by a method such as spin coating. Then, patterning the resist layer 75 to a desired shape is performed by exposure and development using the drain mask 81 indicated in FIG. 11. In the drain mask 81, plural circular shielding regions 86b for forming the circular drain pattern are arranged irregularly in whole regions, other than the shielding regions 86a for forming the data signal line 23, the drain electrodes 24, and the source electrodes 25. The metallic material layer 76 is etched by a wet etching method after patterning the resist layer 75, and the resist layer 75 is stripped off after the etching. In accordance with the etching, the metallic material layer is patterned, and the data signal line 23, the drain electrodes 24, the source electrodes 25, and the circular drain pattern 41 are formed concurrently.

The etching is desirably performed under conditions wherein a taper is formed in consideration of the adhesiveness of the insulating layer 32 formed on the circular drain pattern 41 and a decrease of the flat portion at the top portion of the circular drain pattern 41.

Then, an insulating layer 32 made of insulating material, such as silicon nitride or silicon dioxide, is formed on the insulating layer 11, whereon formation of the switching devices 60, data signal line 23, gate bus line 21, and circular drain pattern 41 have is completed, by the step P5. The thickness of the insulating layer 32 is 500 nm. The contact holes 34 for electrically connecting the source electrodes 25 and the reflecting electrodes 27 are formed in the region where the source electrodes 25 are arranged.

An unevenness reflecting the contour of the circular drain pattern 41 is formed on the surface of the insulating layer 32.

The reflecting electrodes 27 are formed by the step P6 on the insulating layer 32 using a metallic material having a high reflectivity, such as aluminum or silver.

In this way, an unevenness corresponding to the surface contour of the insulating layer 32, that is, the circular drain pattern 41, is formed on the surface of the reflecting electrodes 27.

In accordance with the step P7, the insulating layer 33 made of silicon nitride or silicon dioxide, and an alignment layer 77, made of a homeotropic polyimide group polymer having an alkyl group in its side chain, are formed sequentially on the reflecting electrodes 27.

On the other hand, color filters 72 and the black matrix 73 are formed by a dyeing method on the transparent insulating substrate 12 made of glass or plastics at the side having the transparent electrodes 26 and the color filters 72 of the transparent substrate. Then, the transparent electrodes 26 made of ITO (Indium-Titaniumoxide) and the alignment layer 77 made of polyimide group polymer are formed on the color filters 72 and the matrix 73, sequentially.

The insulating substrate 11 and the transparent insulating substrate 12 formed as described above are joined so as to provide an interval between them, and a reflective liquid crystal display panel is completed with the provision of a liquid crystal layer 71 by injecting a liquid crystal compound into the interval.

The liquid crystal compound for forming the liquid crystal layer 71 is LA-121/4 made by Mitsubishi Chemical Co. and contains a chiral dopant S811 made by Merck Japan Co. by approximately 1%. The thickness of the liquid crystal layer 71 is 7 μm in average. By applying a voltage to the liquid crystal layer 71, a transition between a twisted alignment with application of no voltage and a homeotropic alignment with application of a voltage takes place with no hysteresis.

In accordance with the present embodiment, a TFT with an inverted staggered structure is used as the switching device 60. The switching devices 60 are composed of the gate electrodes 21, the insulating layer 32, the drain electrodes 24, the source electrodes 25, and the semiconductor layer 51, as described previously. A control voltage for regulating the ON/OFF operation of the switching device 60 and a driving voltage for driving the liquid crystal layer 71 are applied to the gate bus line 21 and the data signal line 23, respectively.

The reflecting electrode 27 extends so as to penetrate the contact hole 34 in order to be connected electrically with the source electrode 25, which is a component of the switching device 60. The drain electrode 24 and the reflecting electrode 27 are connected/insulated depending on the ON/OFF state of the switching device 60, and when the switching device 60 is ON, the same voltage as the voltage applied to the drain electrode 24 is applied to the reflecting electrode 27.

The liquid crystal layer 71 produces different optical characteristics depending on the potential difference between the voltage applied to the reflecting electrodes 27 and the voltage applied to the transparent electrodes 26. The display can be realized by utilizing this difference in the optical characteristics.

The circular drain pattern 41 is formed in order to give a light scattering property to the reflecting electrodes 27, as described previously. The unevenness, which reflects the shape or contour of the circular drain pattern 41, is formed on the surface of the insulating layer 32 formed on the circular drain pattern 41. By forming the reflecting electrodes 27 on the insulating layer 32, whereon the unevenness is formed, the shape of the unevenness can be reproduced on the surface of the reflecting electrodes 27. The reflecting electrodes 27 exhibit a light scattering property depending on the unevenness.

The black matrix 73 operates to prevent specular reflection at the data signal line 23 from projecting out from the liquid crystal display apparatus, and operates to prevent optical leakage of the switching device 60. Accordingly, the black matrix 73 is formed in a region, other than the region where the reflecting electrodes 27 are formed, for instance, in the regions facing the switching device 60 and the data signal line 23.

In accordance with the present embodiment, the reflecting electrodes 27 having a light scattering property can be formed using less manufacturing steps than the manufacturing steps required for the conventional liquid crystal display apparatus, because the unevenness on the surface of the insulating layer 32 can be formed without performing any etching process on the insulating layer 32. Furthermore, because the surface of the insulating layer 32 is not etched, the thickness of the insulating layer 32 on the whole surface can be made uniform.

Accordingly, fluctuation of the withstand voltage can be decreased, and the reliability can be improved.

In accordance with the present embodiment, the metallic material layer 76 formed when the drain electrodes 24 are formed is used as the material layer for forming the unevenness. However, the same advantages can be obtained by forming the unevenness with the metallic material layer formed when the gate electrodes 21 are formed, or the material layer formed when the insulating layer 31 or the semiconductor layer 51 is formed.

Embodiment 2

Figure 5:
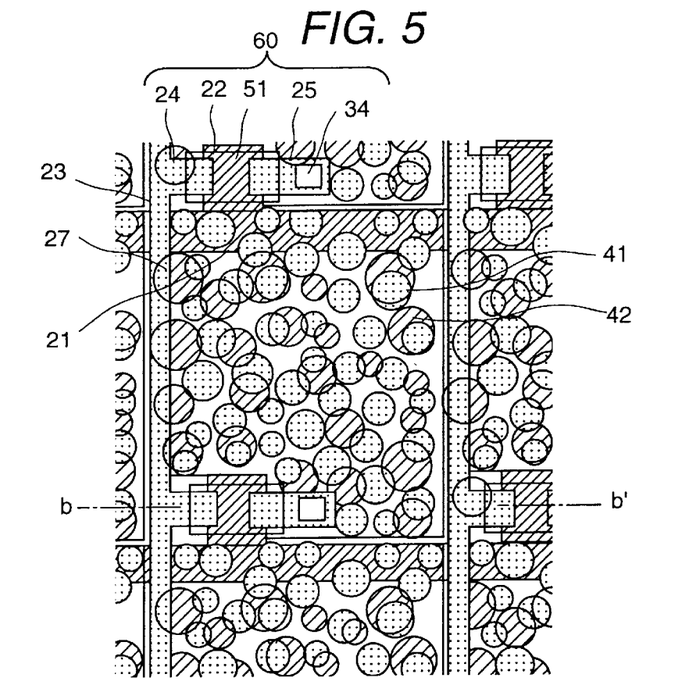
FIG. 5 is a plan view of a substrate at a side having switching devices and reflecting electrodes in a reflective liquid crystal display apparatus representing a second embodiment of the present invention.
Figure 6:
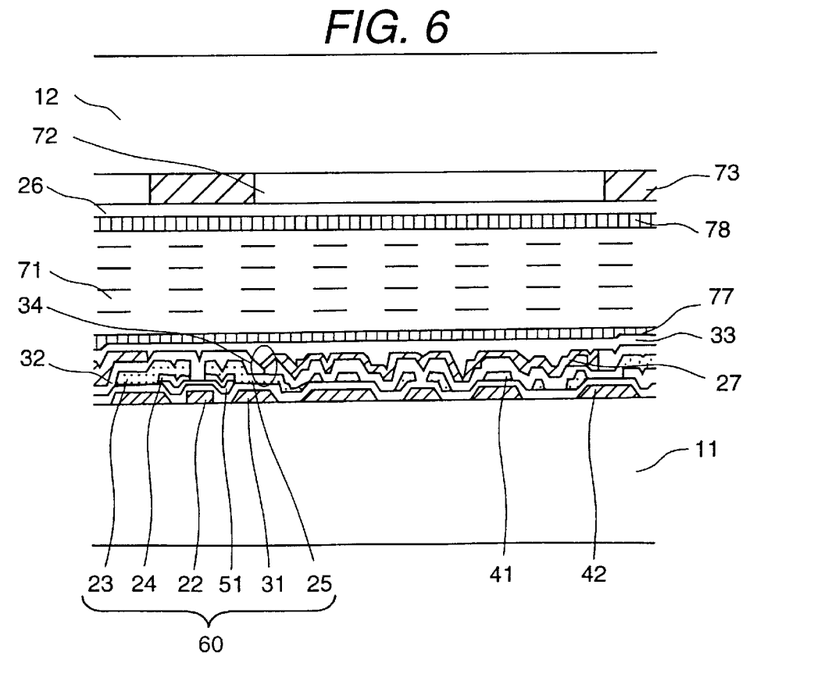
FIG. 6 is a schematic cross sectional view taken along the line b–b' in FIG. 5.

FIG. 5 is a plan view of a substrate at a side having switching devices and reflecting electrodes in a reflective liquid crystal display apparatus representing a second embodiment of the present invention, and FIG. 6 is a schematic cross sectional view taken along the line b–b' in FIG. 5. In the above drawings, the same components as the previous embodiment are designated with the same reference numerals and a duplicated explanation of these components has been omitted.

Figure 12:
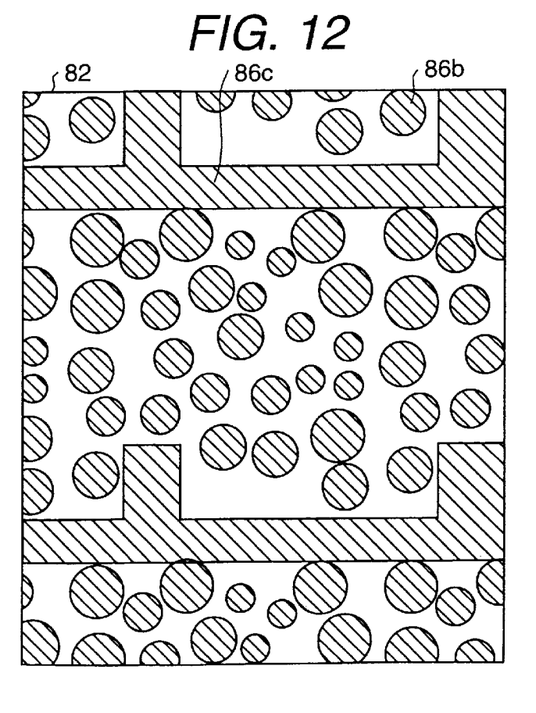
FIG. 12 is a plan view of a gate mask used in forming the circular gate pattern in the second embodiment.

The circular gate pattern 42 is formed simultaneously with the gate electrode 22 and the gate bus line 21, both of which are components of the switching device 60, when they are formed. When the circular gate pattern 42 is formed, the gate mask 82, such as indicated in FIG. 12, is used. In addition to the shielding region 86c, wherein the gate bus line 21 and the gate electrode 22 are formed, plural circular shielding regions 86b for forming the circular gate pattern 42 in the region other than the shielding region 86c are provided randomly on the whole surface of the gate mask 82. The manufacturing steps for forming the circular gate pattern 42, the gate bus line 21, and the gate electrodes 22 are the same as the steps used for forming the circular drain pattern 41 in the previous embodiment 1.

The circular gate pattern 42 has the function of forming an unevenness, which is reflected on the shape of the surface of the reflecting electrodes 27, to give a light scattering property thereto, similar to that provided by the circular drain pattern 41.

In accordance with the present embodiment, the light scattering property can be obtained even if the reflecting electrodes 27 are arranged on the data signal line 23, because the unevenness reflecting the surface contour of the circular gate pattern 42 can be formed even on the surface of the insulating layer 32 arranged on the region where the data signal line 2 is arranged. That means that the aperture ratio of the reflective liquid crystal display apparatus can be improved. Furthermore, the black matrix for preventing specular reflection at the data signal line 23 from projecting out from the reflective liquid crystal display apparatus becomes unnecessary. The flat portion on the surface of the reflecting electrode 27 can be decreased by forming the circular patterns in at least two material layers formed when the switching device 60 is formed, and so a reflecting electrode (reflector) 27 having less specular reflection can be obtained.

Embodiment 3

Figure 7:
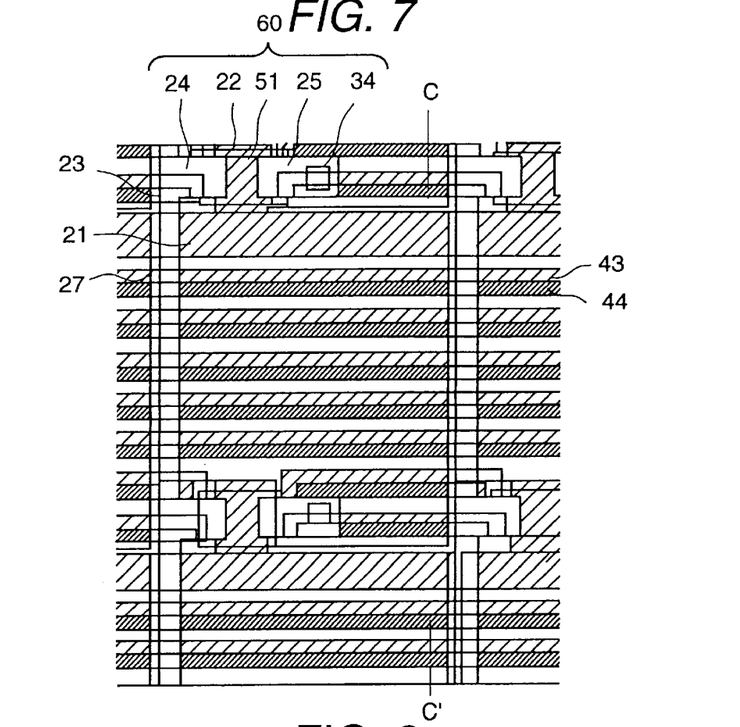
FIG. 7 is a plan view of a substrate at a side having switching devices and reflecting electrodes in a reflective liquid crystal display apparatus representing a third embodiment of the present invention.
Figure 8:
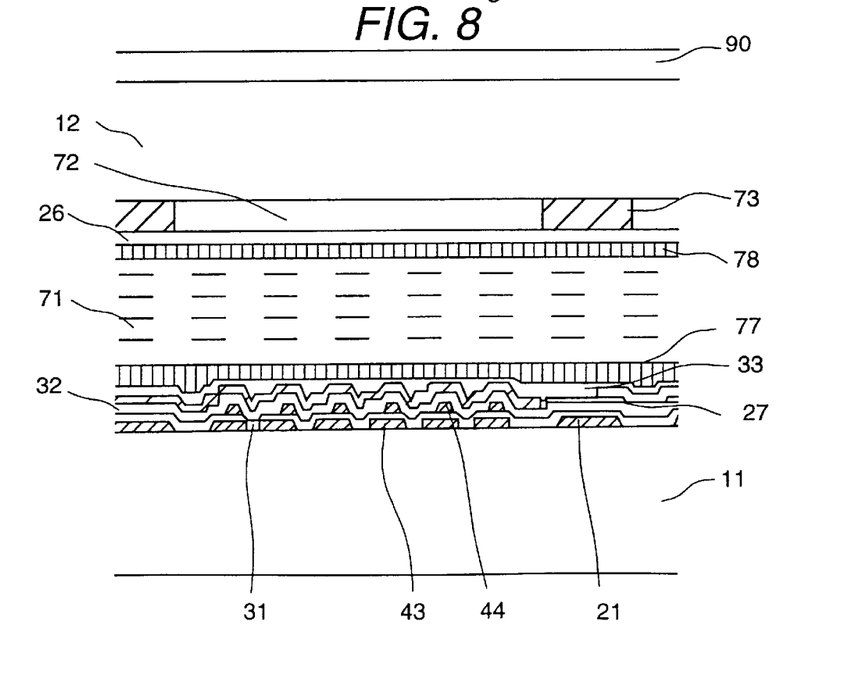
FIG. 8 is a schematic cross sectional view taken along the line c–c' in FIG. 7.

FIG. 7 is a plan view of a substrate at a side having the switching devices and reflecting electrodes in a reflective liquid crystal display apparatus representing a third embodiment of the present invention, and FIG. 8 is a schematic cross sectional view taken along the line c–c' in FIG. 7. In the above drawings, the same components as the previous embodiments are designated with the same reference numerals, and a duplicated explanation of these components has been omitted.

Figure 13:
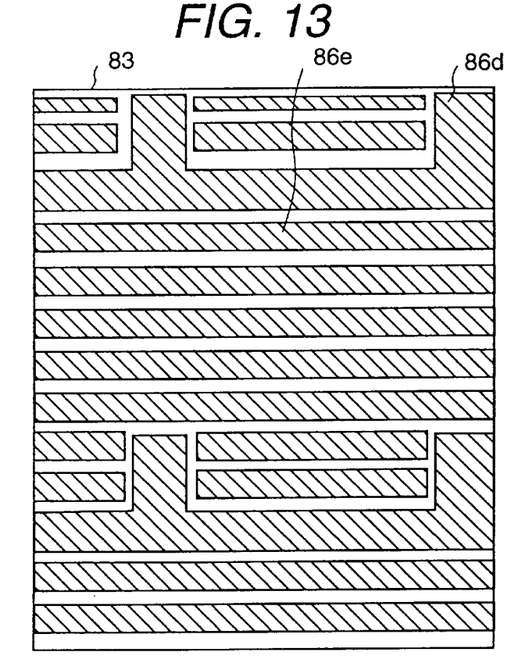
FIG. 13 is a plan view of a gate mask used in forming the cylindrical gate pattern in the third embodiment.

The cylindrical gate pattern 43 of an array of elongated elements extending in a direction substantially parallel to a surface of substrate 11 is formed simultaneously with the gate bus line 21 and the gate electrode 22, when they are formed. When the cylindrical gate pattern 43 is formed, the gate mask 83, such as indicated in FIG. 13, is used. In addition to the shielding region 86a, wherein the gate bus line 21 and the gate electrode 22 are formed, plural cylindrically shaped shielding regions 86e for forming the cylindrical gate pattern 43 in the region other than the shielding region 86a are provided randomly on the whole surface of the gate mask 83. The manufacturing steps for forming the cylindrical gate pattern 43, the gate bus line 21, and the gate electrodes 22 are the same as the steps used for forming the circular drain pattern 41 in the previous embodiment 1.

Figure 14:
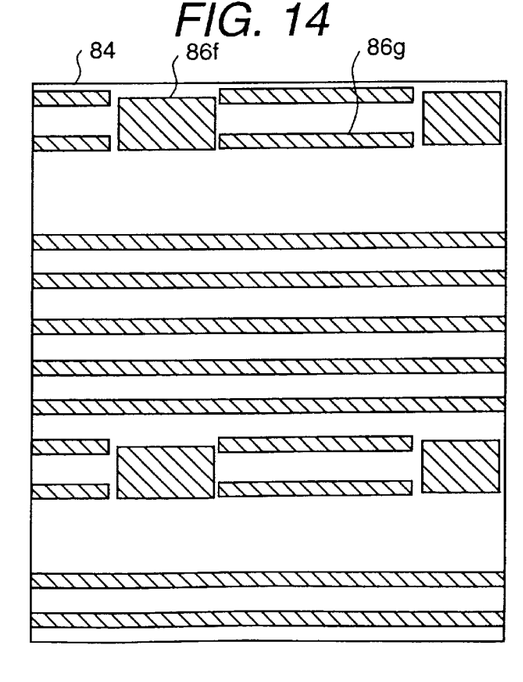
FIG. 14 is a plan view of a semiconductor mask used in forming the cylindrical semiconductor pattern in the fourth embodiment.

The cylindrical semiconductor pattern 44 of an array of elongated elements extending in a direction substantially parallel to a surface 11 is formed simultaneously with the semiconductor layer 51, when the semiconductor layer 51 is formed. When the cylindrical semiconductor pattern 44 is formed, the semiconductor mask 84, such as indicated in FIG. 14, is used. In addition to the shielding region 86f for forming the semiconductor layer 51, plural cylindrically shaped shielding regions 86g for forming the cylindrical semiconductor pattern 44 in the region other than the shielding region 86f are provided randomly on the whole surface of the semiconductor mask 84. The manufacturing steps for forming the cylindrical semiconductor pattern 44 and the semiconductor layer 51 are the same as the steps used for forming the circular drain pattern 41 in the previous embodiment 1.

A film made of PET (Polyethylene terephthalate) and the like, wherein micro spherical particles are dispersed; a film, on which surface saw-teeth grooves are formed; or a film, which is prepared by irradiating ultraviolet rays onto a mixture of two kinds of ultraviolet radiation curing polymers can be used as the scattering film 90.

In accordance with the present embodiment, the cylindrical gate pattern 43 and the cylindrical semiconductor pattern 44 are formed in a manner such that one of their side edges in a longitudinal direction are matched to each other. The width of the cylindrical semiconductor pattern 44 is made smaller in comparison with that of the cylindrical gate pattern 43. By forming the insulating layer 32 on the cylindrical shaped patterns, an unevenness having a directional property reflecting the cylindrical pattern is formed on the surface of the insulating layer 32. Accordingly, an unevenness corresponding to the cylindrical pattern can be formed on the surface of the reflecting electrode 27 by forming the reflecting electrode 27 on the insulating layer 32, whereby a directional property can be realized.

That is, as described previously, the surface of the insulating layer 32 is given a more moderate slope in comparison with the cylindrical gate pattern 43 and the cylindrical semiconductor pattern 44 by laminating the cylindrical gate pattern 41, the insulating layer 31, the cylindrical semiconductor pattern 44, and the insulating layer 32, sequentially. Although the two cylindrical patterns are formed in a manner such that one of the sides of these patterns in a longitudinal direction is matched to that of other, each of the right side and the left side in FIG. 8 has a different slope angle with respect to the other, and the shape of each cross section indicates a saw-tooth shape (the slope angle at a side where the side edges are matched becomes large), because the widths differ from each other. By forming the reflecting electrode 27 on a surface formed in a saw-tooth shape, the surface of the reflecting electrode 27 is given a shape providing an unevenness having a directional property.

The reflecting electrode 27 has a directional property in that the incident light from the upper side of the reflective liquid crystal display apparatus is reflected to the front plane of the apparatus, on account of the two kinds of cylindrical patterns formed by the present embodiment. The reflecting electrode 27 has a mirror plane, but a light scattering property is exhibited by the scattering film 90. Therefore, the reflective liquid crystal display apparatus can be formed, wherein the reflecting electrode 27 has a directional property and less imaging property even though it is a mirror plane.

In order to provide the directional property to reflect incident light from the side direction to the front plane, the cylindrical pattern is formed in the longitudinal direction.

Embodiment 4

Figure 9:
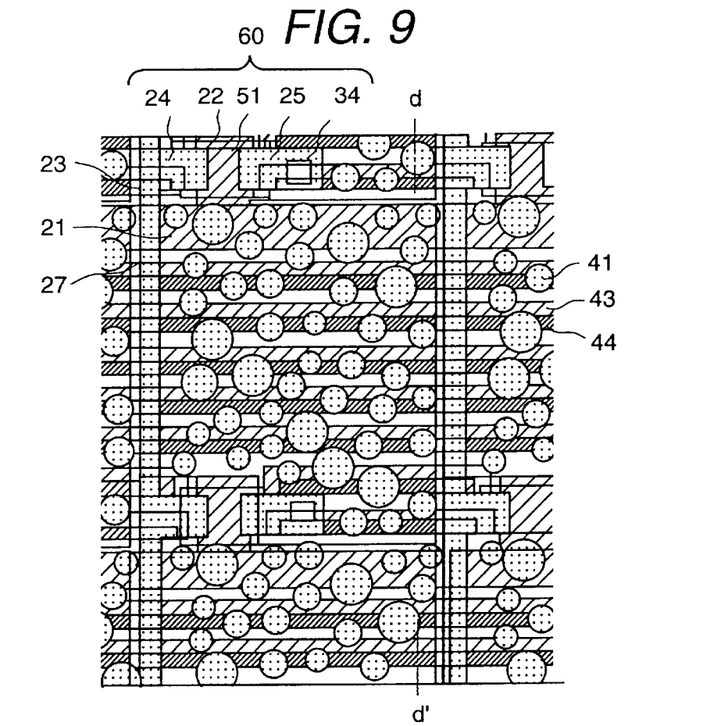
FIG. 9 is a plan view of a substrate at a side having switching devices and reflecting electrodes in a reflective liquid crystal display apparatus representing a fourth embodiment of the present invention.
Figure 10:
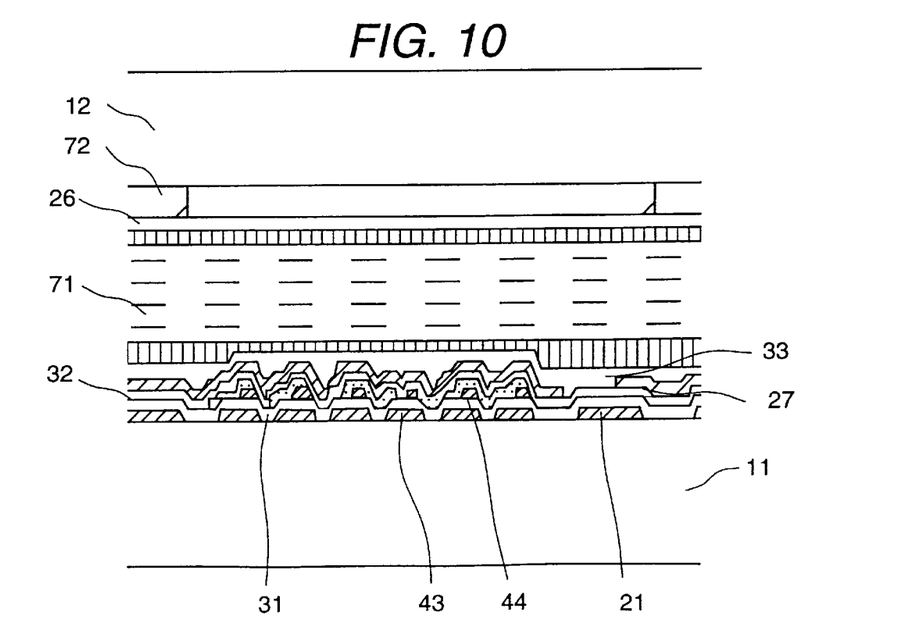
FIG. 10 is a schematic cross sectional view taken along the line d–d' in FIG. 9.

FIG. 9 is a plan view of a substrate at a side having switching devices and reflecting electrodes in a reflective liquid crystal display apparatus representing a fourth embodiment of the present invention, and FIG. 10 is a schematic cross sectional view taken along the line d–d' in FIG. 9. In the above drawings, the same components as the previous embodiments are designated with the same reference numerals and a duplicated explanation of these components will be omitted.

The method of forming the switching devices 60 is the same as in the embodiment 1.

In accordance with the present invention, the circular drain pattern 41, the cylindrical semiconductor pattern 44, and the cylindrical gate pattern 43 are formed in the region where the reflecting electrodes 27 are arranged.

In accordance with this present embodiment, the cylindrical gate pattern 43 and the cylindrical semiconductor pattern 44 give a directional property to the reflecting electrodes 27, and the circular drain pattern 41 gives a scattering property thereto. Therefore, the scattering property and the directional property can be attained with less manufacturing steps in comparison with the conventional reflective liquid crystal display apparatus.

Embodiment 5

The composition of the present embodiment is the same as the embodiment 4, except for the following feature.

In accordance with the present embodiment, polygonal patterns are formed using the materials for a layer for forming the gate bus line 21 and for forming the insulating layer 31 in FIG. 9.

In accordance with the present embodiment, all of the material layers used for forming the switching devices 60 are used for forming the cylindrical patterns or polygonal patterns. By using all the material layers for forming the patterns, it becomes possible to form steps having a larger difference in level, and, accordingly, a stronger scattering property and directional property can be obtained, in comparison with a case in which the polygonal patterns or the cylindrical patterns are formed in only one layer or two layers.

In all of the above mentioned embodiments, the shapes of the circular drain pattern 41 and the circular gate pattern 42 are indicated as a circular shape, but the same advantages as afforded by the circular shape can be obtained with any one of tetragonal, hexagonal, octagonal, or doughnut-shaped shapes. The diameters of the circular drain pattern 41 and the circular gate pattern 42 differ from each other in a given plane, but the same advantages can be obtained with patterns having the same diameters.

In accordance with the present invention, a light scattering property can be given to the reflecting electrode with less manufacturing steps than the conventional liquid crystal display apparatus by forming an unevenness utilizing a material layer which is formed when the switching device is formed.

The unevenness can be formed on the insulating layer on the data signal line by forming the unevenness utilizing at least two kinds of the material layers formed when the switching device is formed. Accordingly, the reflecting electrodes can be formed on the data signal line, and the brightness of the image display can be increased by improving the aperture ratio. Furthermore, the black matrix at the side where the transparent electrodes are provided can be omitted by forming the reflecting electrodes on the data signal lines.

The reflecting electrodes having light reflective characteristics provided with both a directional property and a scattering property can be formed by forming a cylindrical pattern with a material layer and a circular pattern (or polygonal or doughnut-shaped pattern) with residual material layers, utilizing at least two kinds of material layers formed when the switching device is formed.

What is claimed is:

1. A reflective liquid crystal display apparatus comprising:
   a transparent insulating substrate comprising transparent electrodes, switching devices, an insulating substrate comprising reflecting electrodes functioning as a light reflector arranged on said switching devices, and a liquid crystal layer interposed between said transparent insulating substrate and said insulating substrate, wherein:

a cylindrical pattern, including elongated elements extending in a direction substantially parallel to a surface of said insulating substrate, is formed in a region, wherein said reflecting electrodes are arranged, using at least a layer selected from the layers made of metallic materials, semiconductor materials, and insulating materials, all of which are the same material as the material forming said switching devices.

2. A reflective liquid crystal display apparatus comprising:

a transparent insulating substrate comprising transparent electrodes, switching devices, an insulating substrate comprising reflecting electrodes functioning as a light reflector arranged on said switching devices, and a liquid crystal layer interposed between said transparent insulating substrate and said insulating substrate, wherein:

a polygonal pattern is formed using at least a layer selected from the layers made of metallic materials, semiconductor materials, and insulating materials, all of which are the same material as the material forming said switching devices, and a cylindrical pattern, including elongated elements extending in a direction substantially parallel to a surface of said insulating substrate, is formed using at least a layer selected from the layers made of metallic materials, semiconductor materials, and insulating materials, all of which are the same material as the material forming said switching devices, in a region, wherein said reflecting electrodes are arranged.

3. A liquid crystal display apparatus as claimed in any of claims 1 and 2, wherein at least one of width, height, and a distance from an adjacent cylindrical pattern of respective ones of said cylindrical patterns formed under a reflecting electrode is irregular.

4. A liquid crystal display apparatus as claimed in claim 1, wherein said cylindrical pattern is formed using a part of one of the layers made of metallic materials, semiconductor materials and insulating materials forming said switching devices concurrently therewith.

5. A liquid crystal display apparatus as claimed in claim 2, wherein at least one of width, height, and a distance from an adjacent polygonal pattern of respective ones of said polygonal patterns formed under a reflecting electrode is irregular.

6. A liquid crystal display apparatus as claimed in one claim to 2, wherein a scattering film is arranged at a side, opposite to the side where the transparent electrode is arranged, of said transparent insulating substrate.

7. A liquid crystal display apparatus as claimed in claim and 2, wherein surfaces of said reflecting electrodes have polygonal unevenness reflecting the shape of said polygonal pattern.

8. A liquid crystal display apparatus as claimed in claim 7, wherein said reflecting electrodes have a scattering property based on the polygonal unevenness at a surface of said reflecting electrodes.

9. A liquid crystal display apparatus as claimed in any of claims 1 and 2, wherein surfaces of said reflecting electrodes have cylindrical unevenness reflecting the shape of said cylindrical pattern.

10. A liquid crystal display apparatus as claimed in claim 9, wherein said reflecting electrodes have a directional property based on the cylindrical unevenness at a surface of said reflecting electrodes.

11. A liquid crystal display apparatus as claimed in any of claims 1 and 2, wherein a shape of said polygonal pattern is any one of a polygonal shape of at least a hexagonal shape; a circle; an approximate circle; a dough-nut shape; and an ellipse.

12. A liquid crystal display apparatus claimed in claim 2, wherein each of said polygonal pattern and said cylindrical pattern is formed using a part of one of the layers made of metallic materials, semiconductor materials and insulating materials forming said switching devices concurrently therewith.

13. A reflective liquid crystal display apparatus comprising:

a transparent insulating substrate comprising transparent electrodes, switching devices, an insulating substrate comprising reflecting electrodes functioning as a reflector arranged on said switching devices, and a liquid crystal layer interposed between said transparent insulating substrate and said insulating substrate, wherein:

a cylindrical pattern, including elongated elements extending in a direction substantially parallel to a surface of said insulating substrate, is formed using a part of a material layer for forming at least one of a gate bus line and gate insulating film, and a polygonal pattern is formed using a part of a material layer for forming at least one of a semiconductor layer and a data signal line.

* * * * *